US 6,464,045 B2

(12) United States Patent
Weber et al.

(10) Patent No.: US 6,464,045 B2
(45) Date of Patent: Oct. 15, 2002

(54) ROTOR RETAINING CLIP

(75) Inventors: Kevin P. Weber, Montrose; Thomas V. Valvano, Saginaw; Martin J. Reder, Essexville, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/808,759

(22) Filed: Mar. 15, 2001

(65) Prior Publication Data

US 2002/0129998 A1 Sep. 19, 2002

(51) Int. Cl.[7] ............................................... F16D 65/12
(52) U.S. Cl. .............. 188/18 A; 188/73.2; 188/218 XL
(58) Field of Search ..................... 188/18 A, 218 XL, 188/73.2, 218 R, 18 R, 73.31, 250 G; 301/6.8, 105.1, 6.1; 192/70.11; 29/898.04, 434, 402.01, 407.05; 82/1.11, 112, 118; 384/544

(56) References Cited

U.S. PATENT DOCUMENTS

| 5,377,790 A | 1/1995 | Tsuruta |
| 5,381,875 A | 1/1995 | Tsuruta et al. |
| 5,430,926 A * | 7/1995 | Hartford ....................... 29/434 |
| 5,535,856 A | 7/1996 | McCormick et al. |
| 5,538,105 A | 7/1996 | Rike |
| 5,918,707 A | 7/1999 | Saunders, III |
| 5,941,348 A | 8/1999 | Matsumoto et al. |

FOREIGN PATENT DOCUMENTS

| DE | 19918069 | * 11/2000 |
| WO | 0006922 | * 2/2000 |

* cited by examiner

Primary Examiner—Douglas C. Butler
(74) Attorney, Agent, or Firm—Scott A. McBain

(57) ABSTRACT

A disc brake rotor is retained on a bearing hub assembly during handling, shipping and installation of the wheel by a retaining clip. The clip is snapped into a machined groove on the bearing pilot hub after the disc brake rotor is assembled to the bearing and gauged for optimal runout. The retaining clip acts as a physical block thereby keeping the rotor positioned on the bearing hub and eliminates the need for specific orientation of a retention device or removal of material from the disc rotor or wheel as in prior systems.

18 Claims, 4 Drawing Sheets

ROTOR RETAINING CLIP

BACKGROUND OF THE INVENTION

This invention relates generally to automotive disc brake assemblies, and more particularly, to a method and apparatus for mounting a disc brake rotor on a bearing hub during handling, shipping and installation of a wheel on the disc brake assembly.

Virtually all modern passenger automobiles and most modern trucks employ disc brake systems on at least the front wheels of those vehicles. When the driver depresses the brake pedal, a hydraulic system forces brake pads against each side of a disc-shaped, metallic brake rotor. This rotor is attached the automobile at a bearing hub, which is connected to the suspension system. The respective axes around which the bearing hub and the disc brake rotor rotate must be precisely perpendicular to their respective mating surfaces and also aligned with each other to maximize the efficiency and life of the braking system. Misalignment between the rotor and bearing can be caused by any combination of a number of factors including imperfections in the hub and rotor mounting surfaces, inaccuracy in the geometry of the respective parts, improper surface finishing of the rotor or the hub and contaminates or debris.

Brake technicians typically measure misalignment between the bearing hub and the disc rotor using special tools. These tools measure the maximum deflection in the rotor surface which is known as "runout". Typical manufacturer specifications establish a standard acceptable runout as no more than approximately 0.002–0.003 inches. Commonly, the rotor is indexed or rotated until it is optimally mated on the bearing hub to achieve the best possible assembled lateral runout relationship.

During the assembly and manufacturing process of an automobile, the disc brake assembly is typically manufactured and assembled at one location and then transported to another location for assembly with the vehicle wheel and the remainder of the vehicle. As such, the optimal mated relationship between the disc rotor and the bearing hub must be maintained during handling and shipping of the disc brake assembly.

Currently, two methods are typically used to keep the rotor retained to the bearing in such situations. The first method uses a small set screw which threads through a hole in the disc rotor and into a corresponding hole in the bearing to keep the rotor in place on the bearing. However, multiple holes are commonly drilled into the rotor to align the set screw with a predrilled hole in the bearing. Only one of the multiple holes is typically used depending upon the desired orientation of the disc relative to the bearing for optimal runout. Therefore, the non-used or extra holes in the rotor increase the chance of dust, rust and other contaminates collecting in those holes. The non-used or extra holes also present problems and make it difficult to balance the rotor.

The other method commonly practiced today to retain the rotor to the bearing uses Tinnerman nuts or push nuts to keep the rotor in place. The push nuts are press-fit over studs projecting from the bearing after the rotor is seated on the bearing. Typically, at least two, and commonly more, push nuts are used to keep the rotor in place on the bearing by the interference fit between the stud and the push nut. However, pockets or recesses in the rotor or wheel are typically used to accommodate and provide clearance for the push nut. The pockets or recesses are formed in the rotor or wheel surrounding the holes which receive the studs from the bearing. The pockets or recesses remove valuable material from the rotor or wheel around the studs thus decreasing the stiffness in that area of the disc brake assembly and, likewise, increasing the potential runout of the disc brake system. Moreover, the push nuts must be in a specific orientation to work properly thus requiring a conscious effort and an attention to detail for the technician when mounting the push nut.

Therefore, because of the problems associated with existing systems and methods for mounting a disc rotor to a bearing hub, a need continues to exist for an efficient, inexpensive and effective method for doing so without detrimentally impacting manufacturing costs, efficiency and resulting lateral runout of the disc brake assembly.

SUMMARY OF THE INVENTION

This invention efficiently, effectively and inexpensively solves the above-mentioned problems and other problems of known methods and systems for mounting a disc brake rotor to a bearing hub without detrimentally impacting the lateral runout of the disc brake assembly. A presently preferred embodiment of this invention provides a simple and effective device to keep the brake rotor and bearing together during handling, shipping and the installation of the vehicle wheel. In one form, the invention includes a retaining clip which is inserted or snapped into a groove which is machined or otherwise formed in the outer circumference of the pilot hub projecting from the bearing after the disc brake rotor is assembled to the bearing. The clip in a present form is a generally circular split-ring which has a smaller inner diameter than the diameter of the groove in the pilot hub bearing. After the runout between the disc rotor and the bearing hub is gauged and minimized, the split-ring clip is expanded and inserted into the groove on the pilot hub bearing. The expansion and resulting preload on the clip ensures a tight fit. The clip acts as a physical block or detent keeping the rotor positioned against the bearing flange in the desired orientation. The groove in the bearing is machined entirely around the pilot hub, thus eliminating the need to orient the clip onto the bearing unlike prior methods and systems for retaining the rotor on the bearing hub.

In an alternative embodiment of this invention, the groove in the pilot hub includes a beveled edge that allows for the clip to fit snugly against the pilot hub and the rotor with both maximum and minimum material tolerance conditions. The depth of the groove in the pilot hub must be adequate to ensure that the size of the clip does not interfere with the diameter of the brake rotor at a minimum material condition. In a further alternative embodiment, a step is machined in the brake rotor adjacent to the hole through which the pilot hub projects to allow for the use of common bearing applications with different rotor designs. Moreover, the step provides additional clearance for non-standard wheel designs. The clip is designed to be small enough so as not to interfere with the wheel during operation of the vehicle. Moreover, the clip retains the rotor flush on the bearing and does not allow contaminants between the rotor and bearing which can contribute to lateral runout. Furthermore, the clip keeps the bearing and rotor mated together after they have been indexed and gauged for runout.

The orientation of the clip in the groove is not a consideration so the assembly of the clip to the bearing is much less difficult than the implementation of prior systems and methods thereby improving the manufacturability of the disc brake assembly. As such, the assembly process is much less complex and orientation of the screws, push nuts or the like is not a concern with this invention. The clip keeps the rotor in place during manufacturing and shipping and is not removed after the wheel is installed. The clip is small enough so as not to interfere with the wheel when it is assembled so the clip does not need to be removed from the groove. Moreover, lateral runout is improved due to the fact that pockets or recesses are not required in the rotor or the wheel to accommodate the push nut or Tinnerman nut utilized in prior systems and methods.

As a result of this invention, an improved, more efficient and inexpensive system and method is provided for mounting and retaining a disc brake rotor on a bearing hub during initial assembly, installation and shipping compared to known prior art designs.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
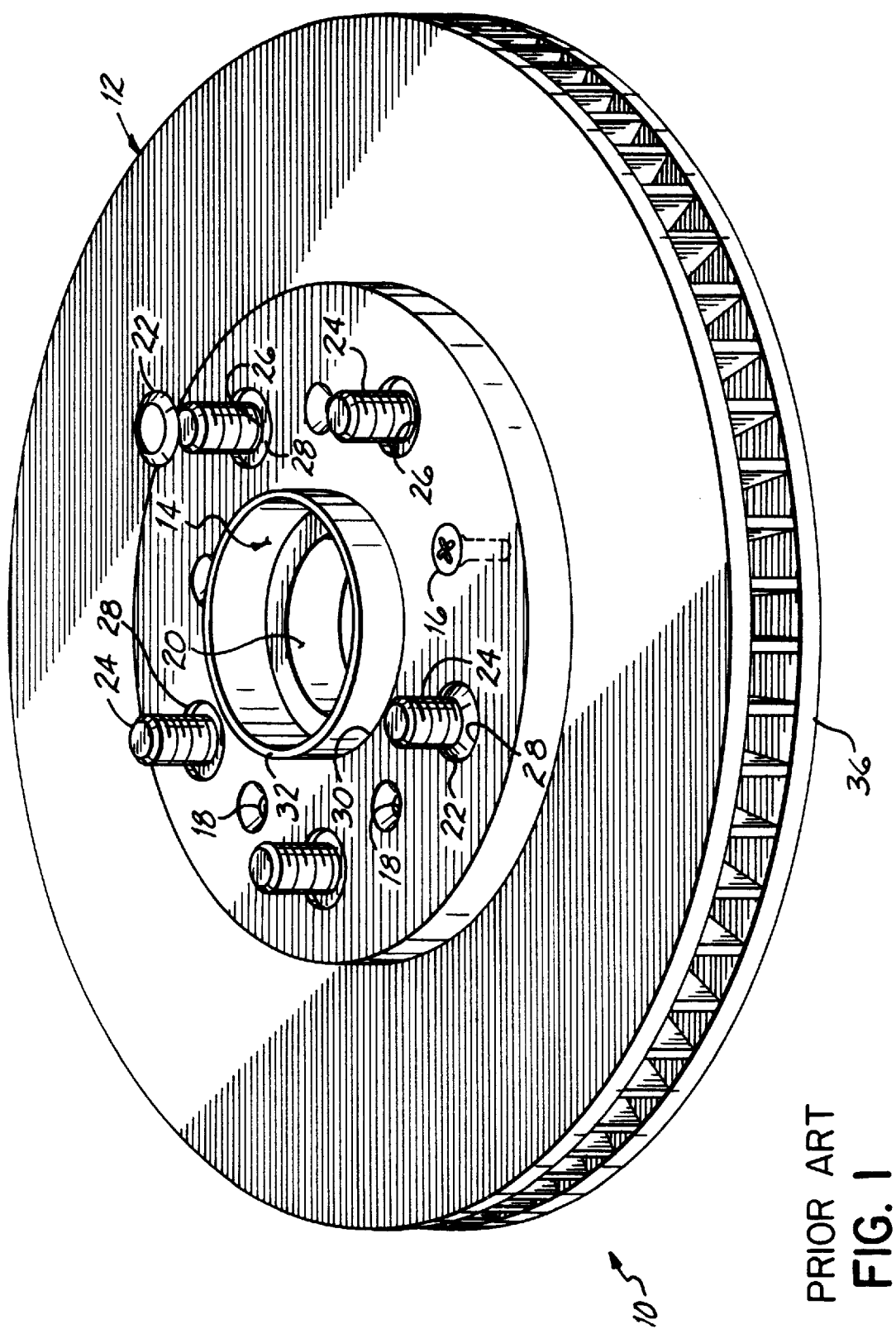
FIG. 1 is a perspective view of the disc brake assembly with prior art systems for retaining the disc brake rotor on a bearing hub.

Referring to FIG. 1, prior art disc brake assembly 10 systems and methods for retaining a disc brake rotor 12 to a hub assembly 14 are shown. Specifically, two alternative prior art systems are shown in FIG. 1. A first prior art system includes the use of a set screw 16 which is threadably received in a threaded hole 18 in the rotor 12 and likewise into a corresponding hole (not shown in FIG. 1) in a bearing spindle 20 portion of the hub assembly. Because the specific orientation of the disc brake rotor 12 relative to the hub assembly 14 is determined based upon the optimal runout configuration, frequently multiple holes 18 in the disc brake rotor 12 are required so that at least one of them is aligned with the corresponding hole in the hub assembly 14 for the set screw 16. The unused holes 18 in the disc brake rotor 12 provide a prime opportunity for contaminates, dust, dirt or the like to be introduced into the disc brake assembly 10. Furthermore, the selection of the appropriate hole pair in the disc brake assembly 10 and the insertion of the set screw 16 therein requires a conscious effort by the technician as well as accurate orientation and alignment of the respective parts for proper assembly.

Alternatively, also as shown in FIG. 1, Tinnerman or push nuts 22 have been used to retain the disc brake rotor 12 to the hub assembly 14. The push nuts 22 are forced downwardly in the proper orientation onto selected threaded studs 24 projecting from the bearing spindle 20 through corresponding stud holes 26 in the disc brake rotor 12. Typically, at least two push nuts 22 are inserted onto individual studs 24 to hold the disc brake rotor 12 to the hub assembly 14. Recesses or pockets 28 are commonly provided in the disc brake rotor 12 or the wheel (not shown) surrounding the stud holes 26 to provide a seat for the push nuts 22 on the associated stud 24. The recesses or pockets 28 are required to provide optimal clearance and avoid interference with the wheel assembly. However, pockets or recesses 28 often weaken disc brake rotors 12 and/or wheel in the area surrounding the studs 24 thereby detrimentally impacting the lateral runout of the disc brake assembly 10. Likewise, the technician must specifically orient the push nuts 22 for proper installation and assembly on the selected studs 24.

Figure 2:
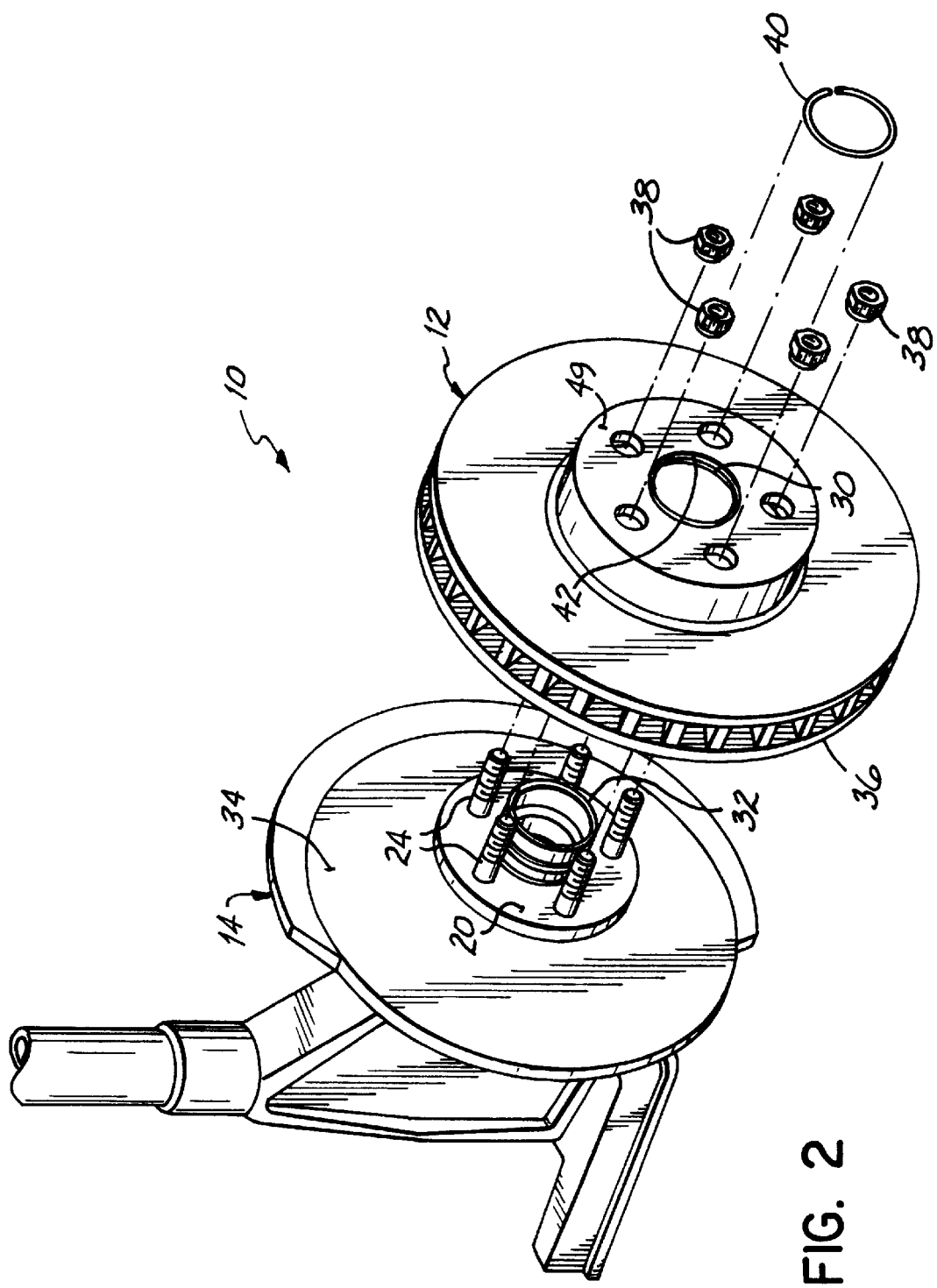
FIG. 2 is a perspective view of the disc brake assembly according to this invention in which the disc brake rotor is retained on the bearing hub by a retaining clip.
Figure 3:
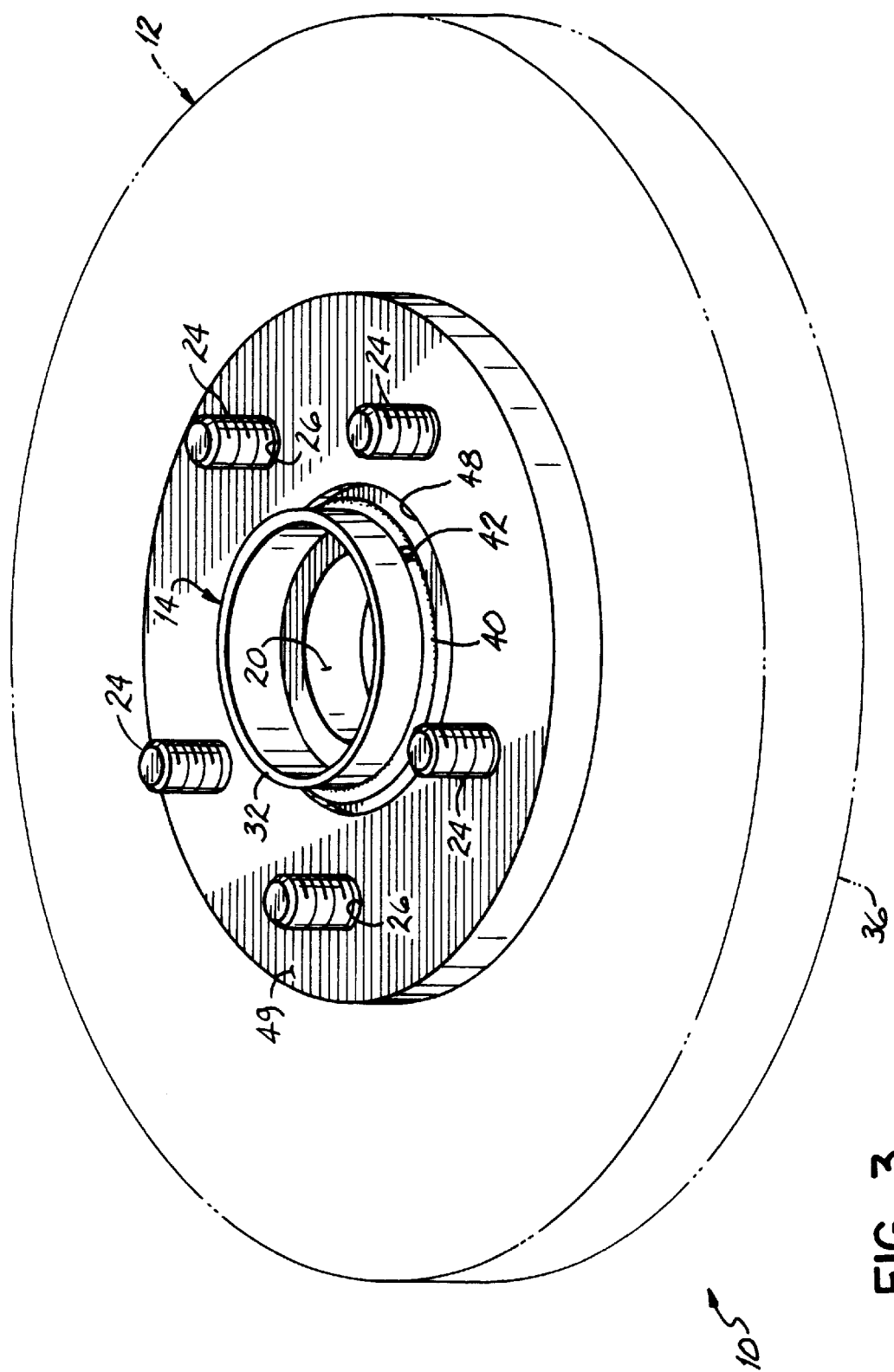
FIG. 3 is a perspective view of the disc brake assembly according to this invention in an assembled configuration.
Figure 4:
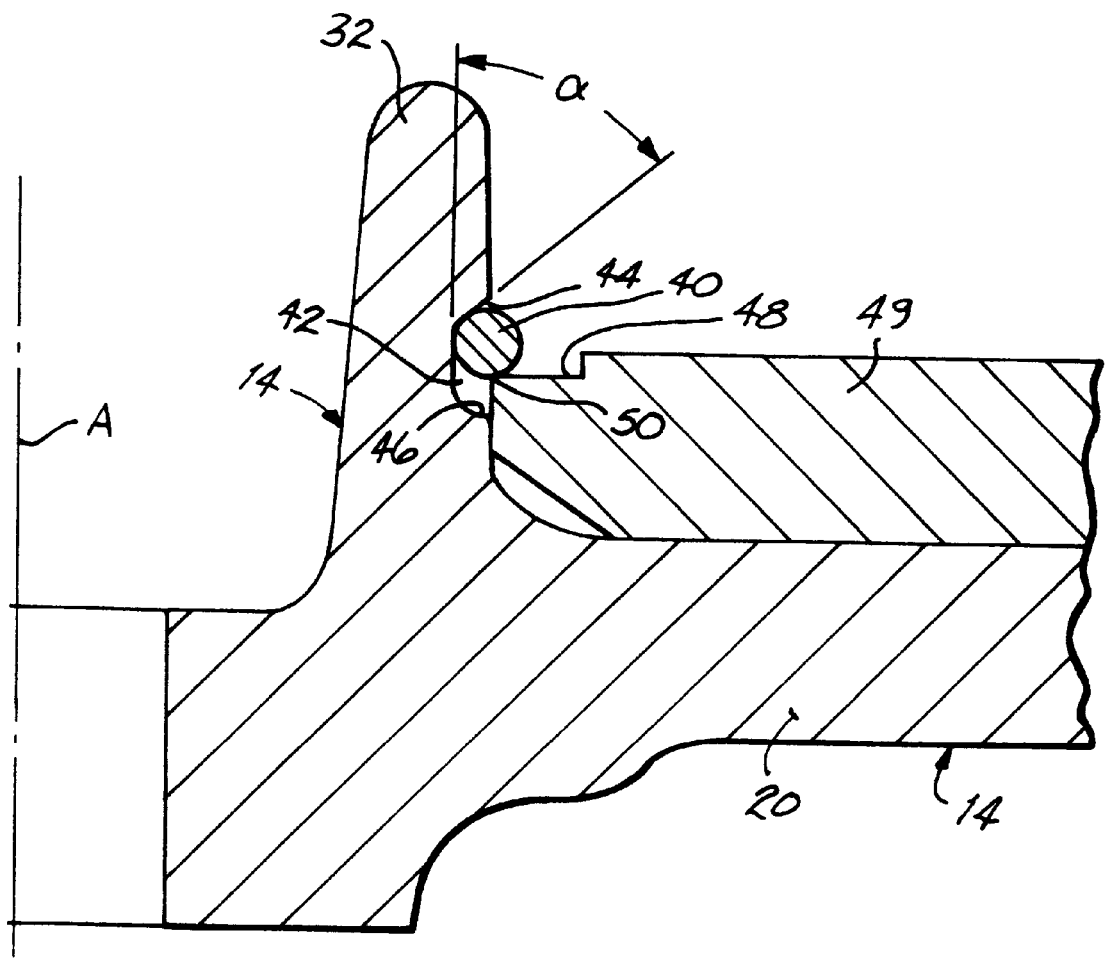
FIG. 4 is a cross-sectional view of the bearing pilot hub, groove, clip and disc rotor of FIG. 3.

The problems described hereinabove with respect to known prior art systems for retaining the disc brake rotor 12 to the hub assembly 14 have been overcome by this invention. Presently preferred embodiments of this invention are shown in FIGS. 2 through 4. Referring to FIG. 2, the disc brake rotor 12 with center axis A includes a central hole 30 through which a bearing pilot hub 32 projecting from the bearing spindle 20 of the hub assembly 14 is inserted for assembly of the disc brake 10. An optimal splash shield 34 surrounds the bearing spindle 20. Threaded studs 24, typically five in number, project from the bearing spindle 20 and through corresponding stud holes 26 in a raised hat portion 49 of the disc brake rotor 12 when assembled with the hub 14. Brake plates 36 surround the hat portion 49 of the rotor 12. A nut 38 is mounted on each of the studs 24 when the wheel is finally assembled with the disc brake assembly 10 although typically the nuts 38 are not utilized when the disc brake rotor 12 is initially mounted to the hub assembly 14 prior to final assembly with the wheel (not shown). As such, the present invention includes a clip 40 which, in a presently preferred embodiment, is a generally circular split-ring clip 40 that is seated in a groove 42 formed around the outer circumference of the bearing pilot hub 32 (see FIGS. 2–4).

After the disc brake rotor 12 is gauged for optimal runout and mounted onto the hub assembly 14, the split-ring clip 40 is temporarily expanded and then snapped into the groove 42 on the bearing pilot hub 32 to retain the disc brake rotor 12 on the hub 14.

The installed clip 40 provides a physical block against the removal or movement of the disc brake rotor 12 relative to the hub 14. Preferably, the groove 42 is machined entirely around the outer surface of the bearing pilot hub 32 so that the proper installation of the clip 40 is independent of the orientation of the clip 40 so long as it is seated within the groove 42 to provide an effective retention mechanism for the disc brake rotor 12 on the hub 14.

As shown specifically in FIG. 4, preferably the groove 42 is machined into the bearing pilot hub 32 to include a beveled edge 44 along an upper end thereof which aids in the convenient, efficient and easy installation of the clip 40 into the groove. Advantageously, when the clip 40 is inserted in the groove 42, a portion of the clip 40 projects outwardly from the groove 42 to provide a physical block for retaining the disc brake rotor 12 on the hub assembly 14 as shown in FIG. 4. Preferably, approximately 30 to 50 percent of the thickness of the clip 40 extends outwardly from the groove 42. Preferably, the beveled edge 44 forms an angle a of approximately 40° and the opposite or lower end 46 of the groove has a radius of 1.5 mm. The entire height of the groove 42 is preferably approximately 4.25 mm and the groove 42 preferably has a depth of approximately 2.05 mm.

Preferably, the clip 42 is manufactured in spring steel or other appropriate material and has an inner diameter of 65.5 mm and a thickness of 3.2 mm. The inner diameter of the clip 40 is approximately 0.5 mm less than the diameter of the groove 42 formed in the pilot hub 32 so as to provide tension in the clip 40 when it is expanded and seated within the groove 42 for interference with the disc brake rotor 12. A step 48 is preferably machined into the raised hat portion 49 of the disc brake rotor 12 adjacent to the hole 30 to accommodate the minimum and/or maximum tolerance, conditions and various mating relationships between the hub assembly 14 and the disc brake rotor. Preferably, the disc brake rotor 12 has a lip 50 of approximately 0.8 mm above the lower edge 46 of the groove 42 when the disk brake rotor 12 is mounted on the hub 14 (FIG. 4). Preferably, a depth of the step 48 is approximately 4.3 mm.

From the above disclosure of the general principles of the present invention and the preceding detailed description of at least one preferred embodiment, those skilled in the art will readily comprehend the various modifications to which this invention is susceptible. For example, other configurations, designs and arrangements of the groove and/or clip can be utilized within the scope of this invention. Therefore, we desire to be limited only by the scope of the following claims and equivalents thereof.

We claim:

1. A disc brake assembly comprising:
    a hub assembly including a bearing having a pilot hub projecting therefrom, a groove in an outer surface of the pilot hub, and a bearing spindle with a plurality of studs projecting therefrom;
    a disc brake rotor having a hole therethrough and being adapted for mounting on the bearing with the pilot hub projecting through the hole; and
    a clip adapted to be seated in the groove to retain the disc brake rotor on the bearing.

2. The disc brake assembly of claim 1 wherein the clip is a split-ring clip having a generally circular configuration.

3. The disc brake assembly of claim 2 wherein the groove is generally circular and an inner circumference of the groove is greater than an inner circumference of the clip.

4. The disc brake assembly of claim 1 further comprising:
    a plurality of stud holes in the rotor configured and adapted to receive therethrough the studs when the rotor is mounted on the bearing.

5. The disc brake assembly of claim 1 wherein the groove includes a beveled edge to accommodate insertion of the clip therein.

6. The disc brake assembly of claim 1 further comprising:
    a step in the rotor proximate the hole and the pilot hub.

7. The disc brake assembly of claim 1 wherein a thickness of the clip is greater than a depth of the groove.

8. The disc brake assembly of claim 1 wherein the groove extends entirely around the pilot hub and the clip extends substantially entirely around the pilot hub when seated in the groove.

9. A disc brake assembly comprising:
    a hub assembly including a bearing having a pilot hub projecting therefrom, a groove in an outer surface of the pilot hub, and a bearing spindle with a plurality of studs projecting therefrom;
    a disc brake rotor having a hole therethrough and being adapted for mounting on the bearing with the pilot hub projecting through the hole;
    a step in the rotor proximate the hole and the pilot hub;
    a split-ring clip adapted to be seated in the groove to retain the disc brake rotor on the bearing, the clip extending substantially entirely around the pilot hub when seated in the groove;
    wherein an inner circumference of the groove is greater than an inner circumference of the clip, the groove includes a tapered edge to accommodate insertion of the clip therein and a thickness of the clip is greater than a depth of the groove.

10. A method of mounting a disc brake rotor to a hub assembly comprising the steps of:
    providing the hub assembly comprising a bearing having a pilot hub projecting therefrom, a groove in an outer surface of the pilot hub, and a bearing spindle with a plurality of studs projecting therefrom;
    providing a disk brake rotor having a hole therethrough and being adapted for mounting on the bearing with the pilot hub projecting through the hole;
    inserting the pilot hub projecting from the bearing through the hole in the disc brake rotor; and
    inserting a clip in the groove on the pilot hub to retain the disc brake rotor on the bearing.

11. The method of claim 10 further comprising:
    gauging runout between the bearing and the disc brake rotor prior to inserting the pilot hub through the hole in the disc brake rotor.

12. The method of claim 10 further comprising:
    orienting the disc brake rotor relative to the bearing to minimize the runout.

13. The method of claim 10 wherein the inserting of the clip is independent of the orientation of the clip.

14. The method of claim 10 wherein the clip is a split-ring clip and the method further comprising:
    expanding the split-ring clip prior to inserting it in the groove on the pilot hub.

15. The method of claim 10 wherein the pilot hub of the bearing is inserted through the hole in the disc brake rotor prior to inserting the clip in the groove.

16. The method of claim 10 wherein the groove extends entirely around the pilot hub and the clip is inserted in the groove irrespective of the orientation of the clip.

17. The method of claim 10 further comprising:
    aligning a plurality of studs projecting from the hub assembly with a corresponding number of stud holes in the disc brake rotor prior to inserting the pilot hub through the hole in the disc brake rotor.

18. A method of mounting a disc brake rotor to a hub assembly wherein the hub assembly includes a bearing having a pilot hub projecting therefrom, a groove in an outer surface of the pilot hub, and a bearing spindle with a plurality of studs projecting therefrom, comprising the steps of:
    gauging runout between the bearing and the disc brake rotor;
    orienting the disc brake rotor relative to the hub assembly to minimize the runout;
    aligning the plurality of studs with a corresponding number of stud holes in the disc brake rotor;
    inserting the pilot hub through a hole in the disc brake rotor; and
    inserting a split-ring clip in the groove to retain the disc brake rotor on the hub assembly;
    expanding the split-ring clip prior to inserting it in the groove;
    wherein the inserting of the clip is independent of the orientation of the clip.

* * * * *